US012518078B2

United States Patent
Lu et al.

(10) Patent No.: US 12,518,078 B2
(45) Date of Patent: Jan. 6, 2026

(54) IMPEDANCE MATCHING METHOD FOR CLC BRANCH OF LOW-FREQUENCY RESONANCE SUPPRESSION DEVICE

(71) Applicant: Hefei Institutes of Physical Science, CAS, Hefei (CN)

(72) Inventors: Jing Lu, Hefei (CN); Pengfei Wang, Hefei (CN); Liuwei Xu, Hefei (CN); Yanan Wu, Hefei (CN); Zhiwei Mao, Hefei (CN); Huafeng Mao, Hefei (CN); Jun Li, Hefei (CN); Yunxiang Tian, Hefei (CN)

(73) Assignee: Hefei Institutes of Physical Science, CAS, Hefei (CN)

( * ) Notice: Subject to any disclaimer, the term of this patent is extended or adjusted under 35 U.S.C. 154(b) by 447 days.

(21) Appl. No.: 18/134,336

(22) Filed: Apr. 13, 2023

(65) Prior Publication Data
US 2023/0409796 A1    Dec. 21, 2023

(30) Foreign Application Priority Data
Jun. 15, 2022  (CN) .......................... 202210671160.3

(51) Int. Cl.
G06F 30/373    (2020.01)
H02J 3/01    (2006.01)
(52) U.S. Cl.
CPC .............. *G06F 30/373* (2020.01); *H02J 3/01* (2013.01); *H02J 2203/20* (2020.01)
(58) Field of Classification Search
CPC ....... G06F 30/373; H02J 3/01; H02J 2203/20; Y02E 40/40
See application file for complete search history.

(56) References Cited

U.S. PATENT DOCUMENTS

2014/0375334 A1* 12/2014 Rodriguez ......... G01R 27/2611
324/602

FOREIGN PATENT DOCUMENTS

CN    109755941 A  *  5/2019

OTHER PUBLICATIONS

Intelligent Apparatus; Chinese Machine Press; Date unknown. (English translation of text included).
(Continued)

*Primary Examiner* — Charles Cai
(74) *Attorney, Agent, or Firm* — Kirk A. Wilson; Joseph T. Guy; Patent Filing Specialist Inc.

(57) ABSTRACT

An impedance matching method for a CLC branch of a low-frequency resonance suppression device is provided, which includes: establishing an equivalent circuit model for a power supply system with a low-frequency resonance suppression device joined in; obtaining, according to a target low-frequency harmonic frequency band and the equivalent circuit model, a constraint required by the power supply system for suppressing low-frequency harmonics; constructing an objective function based on a low-frequency harmonic suppression rate in a bus of the power supply system; obtaining a multi-constraint objective optimization function of CLC branch impedance based on the constraint and the objective function; and solving the multi-constraint objective optimization function through an improved harmony search algorithm to obtain an impedance parameter of the CLC branch. The present disclosure can ensure a low-frequency harmonic suppression effect for the power supply system.

10 Claims, 4 Drawing Sheets

(56) References Cited

OTHER PUBLICATIONS

Jing Lu et al; Research on Optimization Method of Passive Resonance Damping of Hybrid Active Power Filter; 2022 International Conference on Power Energy Systems; pp. 337-343.
Lifu Wang; Power Electron (2nd Edition); Beijing University of Posts and Telecommunications Press; 2017.
Wang Zhaoyi et al; Frequency Converter Application Failures 200 Cases; China Press; 2020.

\* cited by examiner

IMPEDANCE MATCHING METHOD FOR CLC BRANCH OF LOW-FREQUENCY RESONANCE SUPPRESSION DEVICE

CROSS REFERENCE TO RELATED APPLICATION

This patent application claims the benefit of and priority to Chinese Patent Application No. 2022106711603, filed with the Chinese National Intellectual Property Administration on Jun. 15, 2022, the disclosure of which is incorporated by reference herein in its entirety as part of the present application.

TECHNICAL FIELD

The present disclosure relates to the technical field of power grid filtering, and particularly, to an impedance matching method for a CLC branch of a low-frequency resonance suppression device.

BACKGROUND

The widespread use of power electronic equipment brings serious harmonic pollution to a power grid, which may cause parallel resonance and series resonance, thereby amplifying harmonics, affecting normal operation of various electrical equipment, and greatly reducing power quality of the power grid. For a power supply system having a high voltage, a large capacity and complex impedance characteristic, a large quantity of harmonics are generated during load operation, including both high-frequency harmonics and low-frequency harmonics, which are mainly low-frequency harmonics. After the harmonics are resonantly amplified, the stable operation of the system and even the power grid is seriously endangered.

An LC filter achieves suppression of the high-frequency harmonics by being designed as a single-tuned, high-pass filter or the like, and it is also capable of performing reactive power compensation on the power supply system. Low-frequency harmonics close to the fundamental frequency are difficult to be effectively suppressed by the LC filter. An active power filter (APF) can effectively suppress the low-frequency harmonics, but is difficult to be applied in a high-voltage and high-capacity system due to factors such as voltage level, capacity or economy. While a low-frequency resonance suppression device can effectively suppress the low-frequency harmonics in the power supply system having high voltage, large capacity and complex impedance characteristic. In practical application process, an impedance value of a CLC branch of the low-frequency resonance suppression device is usually designed based on a reactive power compensation capacity and a magnitude of a characteristic harmonic current. However, the impedance parameter designed based on a conventional design method is difficult to match the power supply system having high voltage, large capacity and complex impedance characteristic to implement optimal harmonic suppression, which limits widespread use of the low-frequency resonance suppression device.

SUMMARY

In view of the above problem, the present disclosure aims to provide an impedance matching method for a CLC branch of a low-frequency resonance suppression device, which can implement low-frequency harmonics suppression on a power supply system having a high voltage, a large capacity, and complex impedance characteristic, so as to ensure a low-frequency harmonic suppression effect of the power supply system.

According to an embodiment of the present disclosure, an impedance matching method for a CLC branch of a low-frequency resonance suppression device is provided, including:

establishing an equivalent circuit model for a power supply system with a low-frequency resonance suppression device joined in;

obtaining, according to a target low-frequency harmonic frequency band and the equivalent circuit model, constraints required by the power supply system for suppressing low-frequency harmonics;

constructing an objective function based on a low-frequency harmonic suppression rate in a bus of the power supply system;

obtaining a multi-constraint objective optimization function of an impedance of the CLC branch based on the constraints and the objective function; and solving the multi-constraint objective optimization function through an improved harmony search algorithm to obtain an impedance parameter of the CLC branch.

As a modification to the above solution, the method may further include:

testing harmonic content of each order of the power supply system without the low-frequency resonance suppression device joined in, and generating a harmonic content profile; and determining the target low-frequency harmonic frequency band suppressed by the low-frequency resonance suppression device based on the harmonic content profile.

As a modification to the above solution, the constraints may include a first constraint based on a fundamental frequency resonance, a second constraint based on a series resonance frequency, a third constraint based on a reactive power capacity, and a fourth constraint based on a harmonic current.

As a modification to the above solution, the obtaining, according to a target low-frequency harmonic frequency band and the equivalent circuit model, constraints required by the power supply system for suppressing low-frequency harmonics may include:

in the equivalent circuit model, forming the fundamental frequency resonance at a fundamental frequency by using a first inductance and a first capacitance in the CLC branch, to obtain the first constraint based on the fundamental frequency resonance;

arranging an overall series resonance frequency of the CLC branch to be within the target low-frequency harmonic frequency band, to obtain the second constraint based on the series resonance frequency;

obtaining the third constraint based on the reactive power capacity, according to a parameters range of the reactive power capacity that the power supply system can bear; and obtaining the fourth constraint based on the harmonic current, according to a harmonic current at an active power filter in the low-frequency resonance suppression device.

As a modification to the above solution, the first constraint may be expressed as a function of $$F_1\left(Z_1 = \frac{1}{j\omega C_1} - j\omega L_1\right)_{|f=50Hz} = \frac{1}{j\omega C_1} - j\omega L_1 = \varepsilon; \quad (1)$$

$Z_1$ represents an overall impedance formed by the first inductance $L_1$ and the first capacitance $C_1$ in the fundamental frequency resonance of the CLC branch; j represents an imaginary unit; $\omega$ represents an angular frequency of the power supply system; $\varepsilon$ represents infinitesimal; and 50 Hz represents the fundamental frequency.

As a modification to the above solution, the second constraint may be expressed as a function of $$F_2(Z_1+Z_2)|_{f=f^*} = j\omega L_1 + \frac{1}{j\omega C_1} + \frac{1}{j\omega C_2} = \varepsilon, \quad (2)$$

$$f^* \in (f_{low}, f_{high});$$

wherein $Z_2$ represents a capacitive reactance of a second capacitance in the CLC branch; $f_{low}$ and $f_{high}$ represent a lower limit and an upper limit of the target low-frequency harmonic frequency band, respectively; and $C_2$ represents the second capacitance of the CLC branch.

As a modification to the above solution, the third constraint may be expressed as a function of $$F_3\left(\frac{U^2}{|Z_1+Z_2|}\right) = \frac{U^2}{\left|j\omega L_1 + \frac{1}{j\omega C_1} + \frac{1}{j\omega C_2}\right|} \leq \Delta Q; \quad (3)$$

wherein U represents a voltage level of the bus of the power supply system; and $\Delta Q$ represents the parameter range of the reactive power capacity that the power supply system can bear.

As a modification to the above solution, the fourth constraint may be expressed as a function of $$F_4\left(\frac{i_c}{i_{APF}}\right)_{f=f^*} = \left|\frac{Z_1}{Z_1+Z_2+Z_{fq}}\right| > 1, f^* \in (f_{low}, f_{high}); \quad (4)$$

wherein $i_c$ represents a current flowing to the CLC branch; $i_{APF}$ represents a harmonic current generated by the active power filter in the low-frequency resonance suppression device; and $Z_{fq}$ represents an overall equivalent impedance of a passive filter branch in the power supply system.

As a modification to the above solution, the objective function may be:

$$f(Z_1, Z_2) = \left|\frac{i_{sh}}{i_{lh}}\right| = \left|\frac{(Z_1+Z_2)*Z_{fq}}{\left[(1-K)*Z_1+Z_2+(Z_{fq}*Z_s)/(Z_{fq}+Z_s)\right]*(Z_{fq}*Z_s)}\right|; \quad (5)$$

wherein $i_{sh}$ represents a harmonic current on the bus of the power supply system, and $i_{lh}$ represents an equivalent harmonic current source branch current of a harmonic load; $i_{sh}/i_{lh}$ represents the low-frequency harmonic suppression rate in the bus of the power supply system; K represents a set control parameter; $Z_s$ represents an equivalent impedance of the power supply system; and the multi-constraint objective optimization function may be:

$$\begin{cases} \frac{1}{j\omega C_1} - j\omega L_1|_{f=50Hz} = \varepsilon \\ j\omega L_1 + \frac{1}{j\omega C_1} + \frac{1}{j\omega C_2}|_{f=f^*} = \varepsilon, f^* \in (f_{low}, f_{high}) \\ \frac{U^2}{\left|j\omega L_1 + \frac{1}{j\omega C_1} + \frac{1}{j\omega C_2}\right|} \leq \Delta Q \\ \left|\frac{Z_1}{Z_1+Z_2+Z_{fq}}\right|_{f=f^*} > 1, f^* \in (f_{low}, f_{high}) \\ \min f(Z_1, Z_2) = \left|\frac{(Z_1+Z_2)*Z_{fq}}{\left[(1-K)*Z_1+Z_2+(Z_{fq}*Z_s)/(Z_{fq}+Z_s)\right]*(Z_{fq}*Z_s)}\right| \end{cases}$$

As a modification to the above solution, the solving the multi-constraint objective optimization function through an improved harmony search algorithm to obtain an impedance parameter of the CLC branch may include:
  substituting the equivalent impedance of the power supply system, the overall equivalent impedance of the passive filter branch in the power supply system, and the parameter range of the reactive power capacity that the power supply system can bear into the improved harmony search algorithm, to obtain multi-constraint objective optimization functions about the first capacitance, the first inductance, and the second capacitance;
  initializing a harmony parameter of the improved harmony search algorithm; and
  solving the multi-constraint objective optimization functions about the first capacitance, the first inductance and the second capacitance by using the initialized improved harmony search algorithm, to obtain the impedance parameter of the CLC branch.

Compared with the conventional technology, the beneficial effect brought by the embodiments of the present disclosure lies in: the constraint required by the power supply system for suppressing low-frequency harmonics is constructed based on a target low-frequency harmonic frequency band and the equivalent circuit model of the power supply system with the low-frequency resonance suppression device joined in; an objective function is constructed based on a low-frequency harmonic suppression rate in the bus of the power supply system; a multi-constraint objective optimization function of CLC branch impedance is obtained based on the constraint and the objective function; and the multi-constraint objective optimization function is solved through an improved harmony search algorithm to obtain an impedance parameter of a CLC branch. The embodiments of the present disclosure can solve the problem that the impedance parameter of a CLC branch is difficult to be obtained in a conventional configuration method, can implement low-frequency harmonic suppression on a power supply system having a high voltage, a large capacity, and complex impedance characteristic, so as to ensure a low-frequency harmonic suppression effect of the power supply system.

BRIEF DESCRIPTION OF THE DRAWINGS

To describe the technical solutions in the present disclosure more clearly, the following briefly describes the accompanying drawings required for describing the embodiments. Apparently, the accompanying drawings in the following description show merely some implementations of the present disclosure, and a person of ordinary skill in the art may further obtain other drawings from these accompanying drawings without creative efforts.

DETAILED DESCRIPTION OF THE EMBODIMENTS

The following will clearly and fully describe technical solutions in embodiments of the present disclosure with reference to accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Embodiment 1

Figure 1:
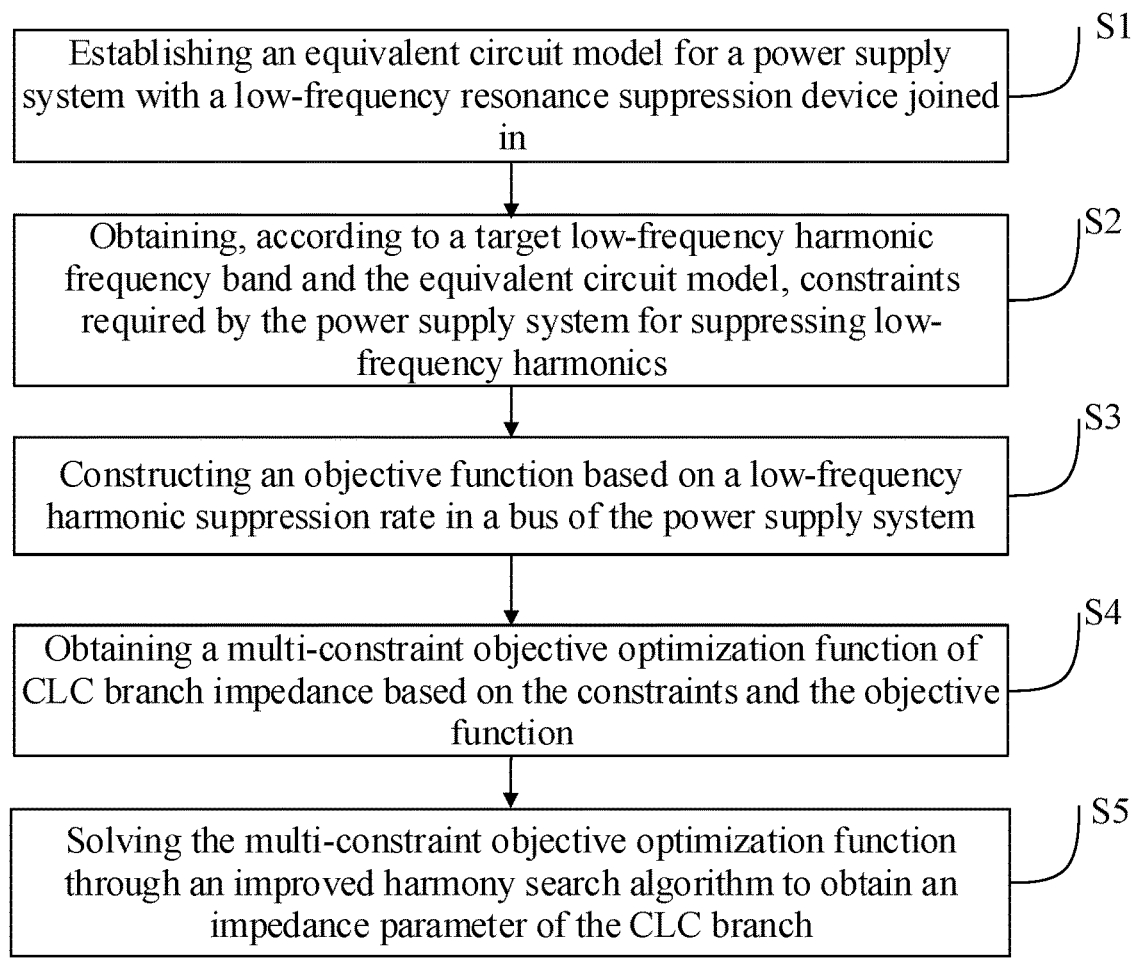
FIG. 1 is a flowchart of the impedance matching method for a CLC branch of a low-frequency resonance suppression device according to an embodiment of the present disclosure.

FIG. 1 is a flowchart of an impedance matching method for a CLC branch of a low-frequency resonance suppression device according to an embodiment of the present disclosure, and the impedance matching method for a CLC branch of a low-frequency resonance suppression device includes the following steps.

S1 includes establishing an equivalent circuit model for a power supply system with a low-frequency resonance suppression device joined in.

Figure 2:
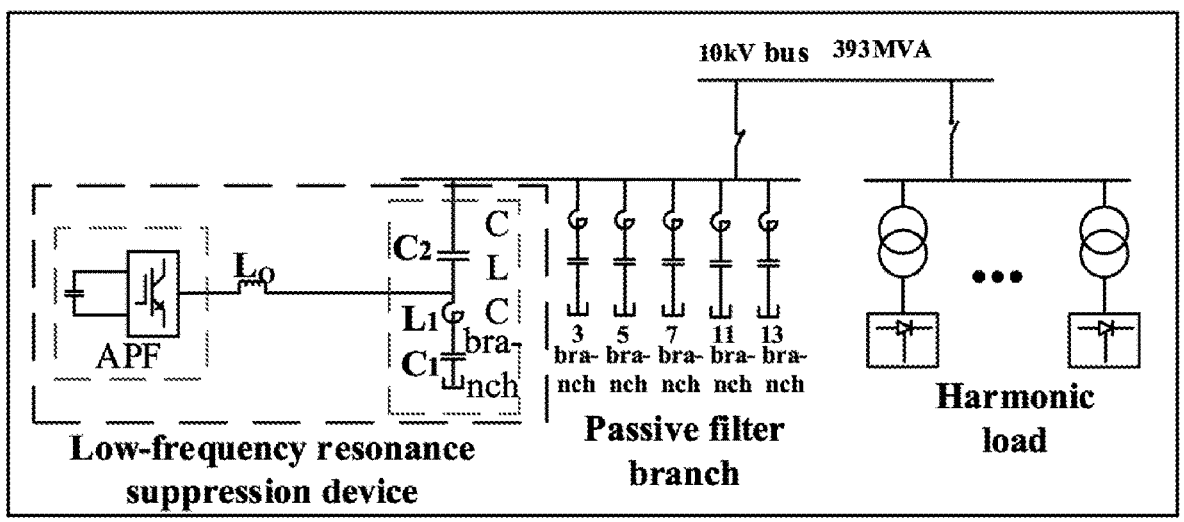
FIG. 2 is a circuit diagram of a power supply system with a low-frequency resonance suppression device joined in according to an embodiment of the present disclosure.

As shown in FIG. 2, the power supply system is mainly composed of a 10 kV power bus, a harmonic load, the passive filter branches, and a low-frequency resonance suppression device. The harmonic load is a rectifier converter, and the passive filter branches consist of Branch 3, Branch 5, Branch 7, Branch 11, and Branch 13, and has functions of filtering and reactive power compensation. The low-frequency resonance suppression device consists of an APF (that is, an active power filter) and a CLC branch. A harmonic current in a target low-frequency harmonic frequency band generated by the APF in the low-frequency resonance suppression device is injected into the CLC branch, and then the harmonic current is resonantly amplified by using the CLC branch and flows into the 10 kV power supply bus, to enable suppression of harmonics.

The harmonics in the 10 kV power supply bus are mainly generated by the rectifier converter, and the rectifier converter can be equivalent to a harmonic current source based on a characteristic of the rectifier converter. Based on the characteristic of the low-frequency resonance suppression device, the low-frequency resonance suppression device may be equivalent to a controlled current source plus a CLC branch to output a harmonic current of a target low-frequency harmonic frequency band. Each branch structure of the passive filter branch is basically consistent, so they can be equivalent to one passive branch to obtain overall equivalent impedance of the passive branch. In the passive filter branch, Branch 3 and Branch 13 are single-tuned filters, and Branch 5 to Branch 11 are high-pass filters. The impedance of each passive branch and the overall equivalent impedance of the passive branch can be expressed as follows:

$$Z_3 = j\omega L_3 - j\frac{1}{\omega C_3};$$

$$Z_5 = \frac{j\omega L_5 * R_5}{R_5 + j\omega L_5} - j\frac{1}{\omega C_5};$$

$$Z_7 = \frac{j\omega L_7 * R_7}{R_7 + j\omega L_7} - j\frac{1}{\omega C_7};$$

$$Z_9 = \frac{j\omega L_9 * R_9}{R_9 + j\omega L_9} - j\frac{1}{\omega C_9};$$

$$Z_{11} = \frac{j\omega L_{11} * R_{11}}{R_{11} + j\omega L_{11}} - j\frac{1}{\omega C_{11}};$$

$$Z_{13} = j\omega L_{13} - j\frac{1}{\omega C_{13}};$$

$$Z_{fq} = \frac{1}{\frac{1}{Z_3} + \frac{1}{Z_5} + \frac{1}{Z_7} + \frac{1}{Z_9} + \frac{1}{Z_{11}} + \frac{1}{Z_{13}}}.$$

$L_3$, $C_3$ represent equivalent inductance and equivalent capacitance of Branch 3 in the passive filter branches; $L_5$, $C_5$, $R_5$ represent equivalent inductance, equivalent capacitance, and equivalent resistance of Branch 5 in the passive filter branches; $L_7$, $C_7$, $R_7$ represent equivalent inductance, equivalent capacitance, and equivalent resistance of the Branch 7 in the passive filter branches; $L_9$, $C_9$, $R_9$ represent equivalent inductance, equivalent capacitance, and equivalent resistance of the Branch 9 in the passive filter branches; $L_{11}$, $C_{11}$, $R_{11}$ represent equivalent inductance, equivalent capacitance, and equivalent resistance of the Branch 11 in the passive filter branches; and $L_{13}$, $C_{13}$, $R_{13}$ represent equivalent inductance, equivalent capacitance, and equivalent resistance of Branch 13 in the passive filter branches.

Figure 3:
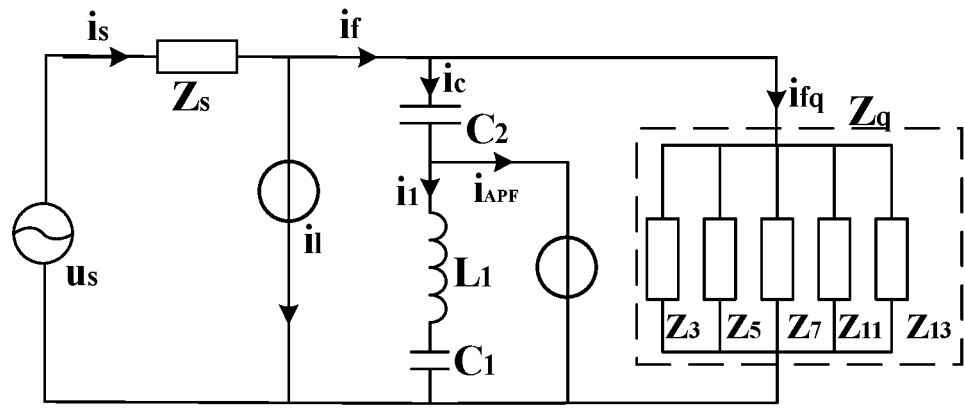
FIG. 3 is a schematic diagram of an equivalent circuit model of a power supply system with a low-frequency resonance suppression device joined in according to an embodiment of the present disclosure.

The equivalent circuit model of the power supply system is established based on characteristics of the low-frequency resonance suppression device, the power supply, the passive filter branch and the harmonic load, an impedance characteristic of the power supply system, and the Kirchhoff voltage and current laws. The equivalent circuit model is shown in FIG. 3, and a mathematical expression of the obtained equivalent circuit model is as follows:

$$\begin{cases} U_{sh} = U_{lh} + i_{sh}Z_s \\ i_{sh} = i_{lh} + i_f \\ Z_{fq} * i_{fq} = U_{lh} \\ i_f = i_c + i_{fq} \\ i_c Z_2 + Z_1 i_1 = U_{lh} \\ i_1 + i_{APF} = i_c \\ i_{APF} = K * (i_c - i_{lh}) \end{cases}$$

$U_{sh}$ is a background harmonic equivalent voltage source of the power supply system, $Z_s$ represents equivalent impedance of the power supply system, $i_{sh}$ represents a harmonic current of the bus of the power supply system, $U_{lh}$ represents an equivalent harmonic current source branch voltage of harmonic load, $i_{lh}$ represents an equivalent harmonic current source branch current of harmonic load, $Z_{fq}$ represents the overall equivalent impedance of the passive filter branch, $i_{fq}$ represents a current flowing into the passive filter branch, $i_c$ represents a current flowing to the CLC branch, $Z_1$ is overall impedance of fundamental frequency resonance $L_1$ and $C_1$ in CLC branch, $i_1$ represents a current flowing to a fundamental frequency resonance branch in the CLC branch, $Z_2$ is a capacitive reactance of a second capacitance in the CLC branch, $i_{APF}$ is a harmonic current generated by the APF in the low-frequency resonance suppression device, and K represents a set control parameter. It should be noted that K has a constant value when studying impedance parameter matching.

S2 includes obtaining, according to a target low-frequency harmonic frequency band and the equivalent circuit model, constraints required by the power supply system for suppressing low-frequency harmonics.

The constraints include a first constraint based on fundamental frequency resonance, a second constraint based on a series resonance frequency, a third constraint based on a reactive power capacity, and a fourth constraint based on a harmonic current.

Further, the obtaining, according to a target low-frequency harmonic frequency band and the equivalent circuit model, constraints required by the power supply system for suppressing low-frequency harmonics includes:

forming the fundamental frequency resonance at a fundamental frequency, in the equivalent circuit model, by using first inductance and first capacitance in the CLC branch, to obtain the first constraint based on the fundamental frequency resonance;

arranging an overall series resonance frequency of the CLC branch to be within the target low-frequency harmonic frequency band, to obtain the second constraint based on the series resonance frequency;

obtaining the third constraint based on the reactive power capacity, according to a parameter range of the reactive power capacity that the power supply system can bear; and obtaining the fourth constraint based on the harmonic current, according to a harmonic current at the active power filter in the low-frequency resonance suppression device.

In the CLC branch, $L_1$ and $C_1$ form the fundamental frequency resonance at the fundamental frequency, and the first constraint based on the fundamental frequency resonance can be obtained, and its specific function is expressed as:

$$F_1\left(Z_1 = \frac{1}{j\omega C_1} - j\omega L_1\right)_{|f=50\,Hz} = \frac{1}{j\omega C_1} - j\omega L_1 = \varepsilon; \quad (1)$$

$Z_1$ represents an overall impedance formed by the first inductance $L_1$ and the first capacitance $C_1$ of CLC branch fundamental frequency resonance; j represents an imaginary unit; $\omega$ represents an angular frequency of the power supply system; $\varepsilon$ represents infinitesimal; and 50 Hz represents a fundamental frequency.

The CLC branch of the low-frequency resonance suppression device joining into the power supply system, may generate new series resonance. To avoid that a new resonance point coincides with a characteristic-order harmonic frequency existing in the power supply system, in an embodiment of the present disclosure, the overall series resonance frequency of the CLC branch is arranged to be within a target low-frequency harmonic frequency band that needs to be filtered out, so that the second constraint based on the series resonance frequency can be obtained, and a specific function is expressed as:

$$F_2(Z_1 + Z_2)_{|f=f^*} = j\omega L_1 + \frac{1}{j\omega C_1} + \frac{1}{j\omega C_2} = \varepsilon, \quad (2)$$

$$f^* \in (f_{low}, f_{high});$$

$Z_2$ represents capacitive reactance of the second capacitance of the CLC branch; $f_{low}$ and $f_{high}$ represent a lower limit and an upper limit of the target low-frequency harmonic frequency band; and $C_2$ represents the second capacitance of the CLC branch.

The CLC branch joining into the power supply system, may change an original reactive power capacity of the power supply system. Therefore, a design of an impedance parameter of the CLC branch shall enable that a change of the reactive power capacity is within a bearable range of the power supply system, and the third constraint based on the reactive power capacity can be obtained, and its specific function is expressed as:

$$F_3\left(\frac{U^2}{|Z_1 + Z_2|}\right) = \frac{U^2}{\left|j\omega L_1 + \frac{1}{j\omega C_1} + \frac{1}{j\omega C_2}\right|} \leq \Delta Q; \quad (3)$$

U represents a bus voltage level of the power supply system; and $\Delta Q$ represents a parameter range of the reactive power capacity that the power supply system can bear.

The harmonic current generated by the APF in the low-frequency resonance suppression device flows into the power supply system bus through resonance amplification of the CLC branch, so as to suppress harmonics of the power supply system bus. A CLC branch harmonic current value should be greater than a harmonic current value at the APF, so that the fourth constraint based on the harmonic current can be obtained, and its specific function is expressed as:

$$F_4\left(\frac{i_c}{i_{APF}}\right)_{f=f^*} = \left|\frac{Z_1}{Z_1 + Z_2 + Z_{fq}}\right| > 1, f^* \in (f_{low}, f_{high}); \quad (4)$$

$i_c$ represents a current flowing to the CLC branch; $i_{APF}$ represents a harmonic current generated by the active power filter in the low-frequency resonance suppression device; and $Z_{fq}$ represents overall equivalent impedance of the passive filter branch in the power supply system.

S3 includes constructing an objective function based on a low-frequency harmonic suppression rate in the bus of the power supply system.

With the low-frequency harmonic suppression rate in the power supply system bus as an objective function, an expression of the objective function can be obtained as follows:

$$f(Z_1, Z_2) = \quad (5)$$

$$\left|\frac{i_{sh}}{i_{lh}}\right| = \left|\frac{(Z_1 + Z_2) * Z_{fq}}{\left[(1-K)*Z_1 + Z_2 + (Z_{fq}*Z_s)/(Z_{fq} + Z_s)\right] * (Z_{fq}*Z_s)}\right|;$$

$i_{sh}$ represents a harmonic current on the bus of the power supply system, and $i_{lh}$ represents an equivalent harmonic current source branch current of the harmonic load; $i_{sh}/i_{lh}$ represents a low-frequency harmonic suppression rate in the bus of the power supply system; K represents a set control parameter; and $Z_s$ represents an equivalent impedance of the power supply system.

S4 includes obtaining a multi-constraint objective optimization function of CLC branch impedance based on the constraints and the objective function.

One multi-constraint objective optimization function for the CLC branch impedance can be obtained by combining the constraints with the objective function, which can be specifically expressed as:

$$\begin{cases} \left. \dfrac{1}{j\omega C_1} - j\omega L_1 \right|_{f=50 \text{ Hz}} = \varepsilon \\ \left. j\omega L_1 + \dfrac{1}{j\omega C_1} + \dfrac{1}{j\omega C_2} \right|_{f=f^*} = \varepsilon,\ f^* \in (f_{low}, f_{high}) \\ \dfrac{U^2}{\left| j\omega L_1 + \dfrac{1}{j\omega C_1} + \dfrac{1}{j\omega C_2} \right|} \leq \Delta Q \\ \left. \left| \dfrac{Z_1}{Z_1 + Z_2 + Z_{fq}} \right| \right|_{f=f^*} > 1,\ f^* \in (f_{low}, f_{high}) \\ \min f(Z_1, Z_2) = \left| \dfrac{(Z_1 + Z_2) * Z_{fq}}{[(1-K)*Z_1 + Z_2 + (Z_{fq} + Z_s)]*(Z_{fq}*Z_s)} \right| \end{cases}$$

S5 includes solving the multi-constraint objective optimization function through an improved harmony search algorithm to obtain an impedance parameter of the CLC branch. In an embodiment of the present disclosure, a constraint required by the power supply system for suppressing low-frequency harmonics is constructed based on the target low-frequency harmonic frequency band and the equivalent circuit model of the power supply system with the low-frequency resonance suppression device joined in; an objective function is constructed based on the low-frequency harmonic suppression rate in the bus of the power supply system; then a multi-constraint objective optimization function of the CLC branch impedance is obtained by combining the constraint and the objective function; and finally, the multi-constraint objective optimization function is solved through the improved harmony search algorithm to obtain an impedance parameter of the CLC branch. The embodiment of the present disclosure can solve the problem that the impedance parameter of the CLC branch is difficult to be obtained in a conventional configuration method, can implement low-frequency harmonic suppression on a power supply system having a high voltage, a large capacity, and complex impedance characteristic, so as to ensure a low-frequency harmonic suppression effect of the power supply system, and has a value in engineering application.

In an optional embodiment, the method further includes:
testing each harmonic content of the power supply system without the low-frequency resonance suppression device joined in, and generating a harmonic content profile; and
determining the target low-frequency harmonic frequency band suppressed by the low-frequency resonance suppression device based on the harmonic content profile.

Figure 4:
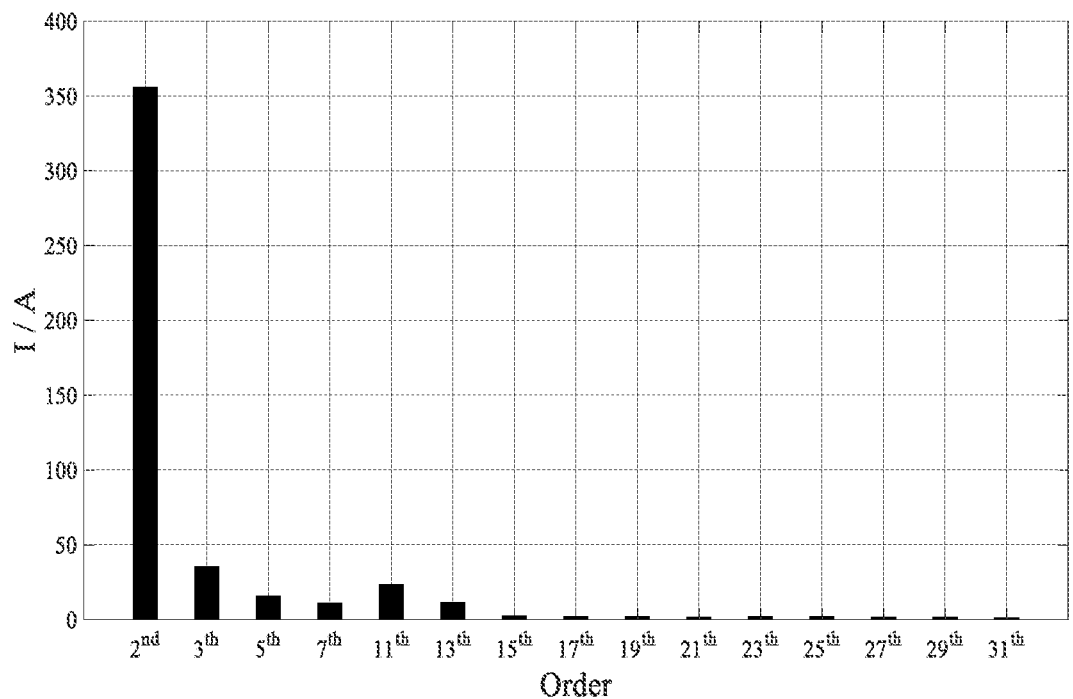
FIG. 4 is a harmonic content profile according to an embodiment of the present disclosure.

In the embodiment of the present disclosure, harmonics of each order of the power supply system without the low-frequency resonance suppression device is tested, a content profile for harmonics of each order of the power supply system without the low-frequency resonance suppression device is obtained based on on-site test data, as shown in FIG. 4. The target low-frequency harmonic frequency band to be suppressed by the low-frequency resonance suppression device is determined based on the harmonic content profile. In the power supply system, the 3th harmonic and above are suppressed by the passive filter branch, and the low-frequency harmonic frequency band below the $3^{rd}$ harmonic is suppressed by the low-frequency resonance suppression device. As shown in FIG. 4, a target low-frequency harmonic band is mainly a second harmonic, so that the target low-frequency harmonic frequency band is set to be 75 Hz to 125 Hz in the embodiment of the present disclosure.

In an optional embodiment, the solving the multi-constraint objective optimization function through an improved harmony search algorithm to obtain an impedance parameter of the CLC branch includes:
substituting the equivalent impedance of the power supply system, the overall equivalent impedance of the passive filter branch in the power supply system, and the parameter range of the reactive power capacity that the power supply system can bear into the improved harmony algorithm, to obtain multi-constraint objective optimization functions of the first capacitance, the first inductance, and a second capacitance;
initializing a harmony parameter of the improved harmony algorithm; and
solving the multi-constraint objective optimization functions of the first capacitance, the first inductance and the second capacitance by using the initialized improved harmony algorithm, to obtain the impedance parameter of the CLC branch.

Figure 5:
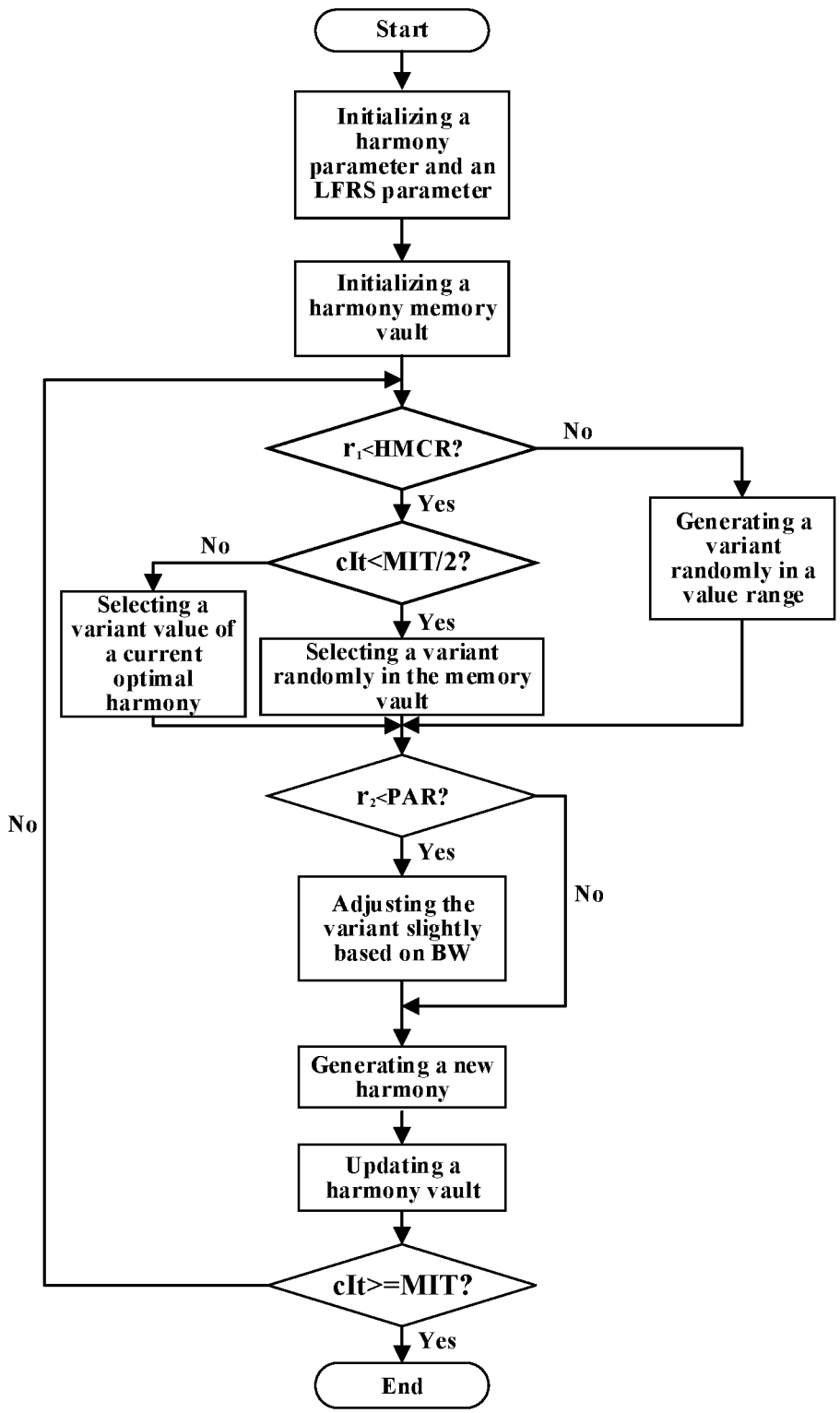
FIG. 5 is a flowchart of an improved harmony search algorithm.

By way of example, an improved harmony algorithm flow is described below with reference to FIG. 5.

(1) Substituting specific values of the equivalent impedance of the power supply system, the overall equivalent impedance of the passive filter branch in the power supply system, and the parameter range of the reactive power capacity that the power supply system can bear into the improved harmony algorithm, to obtain specific expressions of multi-constraint objective optimization problems with respect to $Z_1$ and $Z_2$, that is $C_1$, $L_1$ and $C_2$.

(2) Setting related harmony parameters of the improved harmony search algorithm to be: HMS=5, HMCR=0.9, PARmin=0.4, PARmax=0.9, BWmin=0.0001, BWmax=1 and MIT=3000.

(3) Generating an initial value of a harmony memory vault randomly within a value range of a harmony vector, determining a size of the harmony memory vault based on the set HMS value, where it is based on the constraint that the value range of the harmony vector is determined.

(4) Comparing a generated random number $r_1$ between (0, 1) and the value of the parameter HMCR based on a search mechanism of the improved harmony search algorithm, to determine an initial value of a new harmony vector. A value-taking method is as follows:

$$\begin{cases} x_i^{new} \in \{x_i^1\ \dots\ x_i^{HMS}\} & r_1 < HMCR,\ 0 < clt < \dfrac{1}{2} MIT \\ x_i^{new} \in x_{Best}(i) & r_1 < HMCR,\ \dfrac{1}{2} MIT < clt < MIT \\ x_i^{new} \in X_i,\ x_i^{new} \notin \{x_i^1\ \dots\ x_i^{HMS}\} & r_1 \geq HMCR \end{cases}$$

$x_i$ represents the harmony vector, and $X_i$ represents the value range of the harmony vector.

(5) Comparing the generated random number $r_2$ between (0, 1) and the value of the parameter PAR based on a non-linear time-varying rule of set PAR and BW, to determine whether the initial value of the new harmony vector is slightly adjusted, so as to determine a final value of the new harmony vector.

$$PAR = PAR_{min} + \frac{PAR_{max} - PAR_{min}}{MIT} \times cIt$$

$$BW = \begin{cases} BW_{max} \times e^{\ln\frac{BW_{min}}{BW_{max}} \times cIt} & 0 < cIt \le \frac{3}{4}MIT \\ BW_{min} & \frac{3}{4}MIT < cIt < MIt \end{cases}$$

$$\begin{cases} x_i^{new} = x_i^{new} & r_2 \ge PAR \\ x_i^{new} = x_i^{new} \pm ra * BW & r_2 < PAR \end{cases}$$

(6) Substituting new harmony vectors generated in steps (4) and (5) into the multi-constraint objective optimization function, to obtain an objective function value.

(7) Substituting the newly obtained objective function value into the harmony memory bank, to update the harmony memory bank.

(8) Determining whether a current quantity of iterations is greater than a maximum quantity of iterations, and if the current quantity of iterations is greater than the maximum quantity of iterations, ending the improved harmony search algorithm, otherwise performing step (5).

(9) Outputting an optimal solution of the objective function in the harmony memory bank, that is, an optimal solution of the impedance parameter of the CLC branch.

Figure 6:
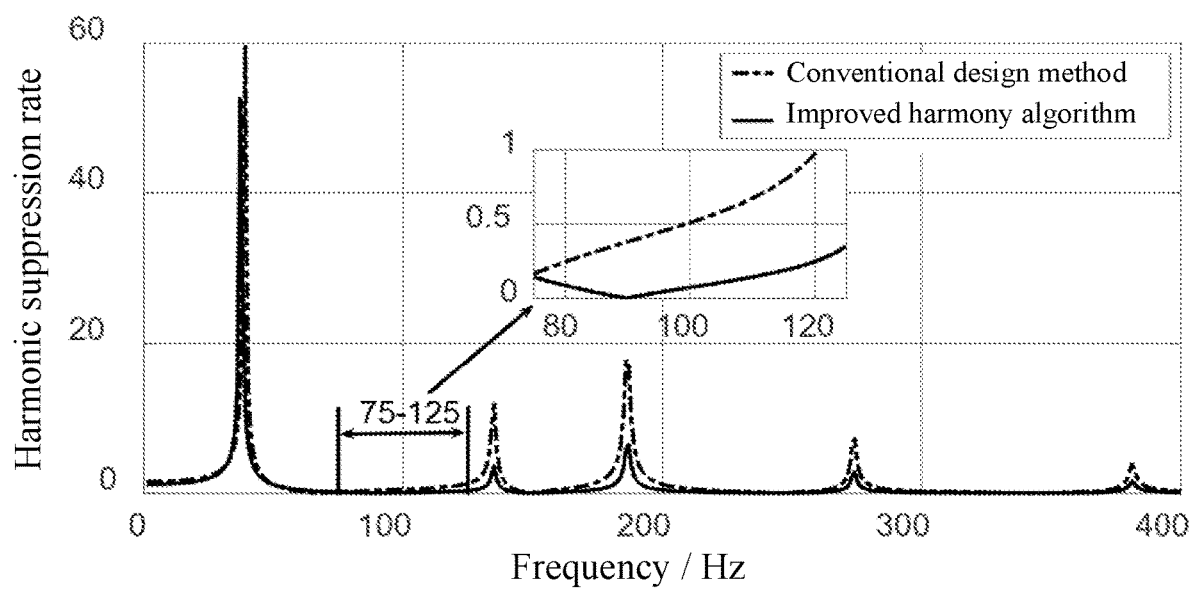
FIG. 6 is a comparison chart of low-frequency harmonic suppression effects by impedance parameters of the CLC branch, respectively obtained through the conventional method and an improved harmony search algorithm.

Optimal impedance parameters of the CLC branch can be obtained, based on the foregoing steps, as follows: $C_1$=338 µF, $L_1$=30 mH, $C_2$=152 µF. An optimal harmonic suppression effect of the impedance parameter obtained by using the improved harmony search algorithm is shown in FIG. 6. Compared with conventional design methods, the harmonic suppression effect is significantly improved.

Compared with the conventional technology, a beneficial effect of the embodiments of the present disclosure is as follows. With fundamental frequency resonance of the CLC branch, overall series resonance of the CLC branch and a resonance amplification effect of the CLC branch of the low-frequency resonance suppression device, and a reactive power capacity of the power supply system as constraints, with a harmonic suppression rate of the power supply system bus as an objective function, by abstracting an impedance matching design of the CLC branch of the low-frequency resonance suppression device as one multi-constraint target optimization problem, and then, solving the multi-constraint target optimization problem by using the improved harmony search algorithm to obtain an optimal solution of the impedance parameter of the CLC branch, it is possible to solve the problem that the impedance parameter of the CLC branch is difficult to be obtained in a conventional configuration method, implement low-frequency harmonic suppression to a power supply system with a high voltage, a large capacity, and complex impedance characteristic, so as to ensure a low-frequency harmonic suppression effect of the power supply system, which has a value in industrial application.

It should be noted that the device embodiments described above are merely illustrative, where the unit described as a separate component may or may not be physically separated, and a component defined as a unit may or may not be a physical unit, that is, the component may be located at one place, or distributed on a plurality of network units. Some or all of the modules may be selected based on actual needs to achieve the objectives of the solutions of the embodiments. In addition, in the accompanying drawings of the device embodiments provided in the present disclosure, a connection relationship among modules represents a communication connection among the modules, which may be specifically implemented as one or more communication buses or signal lines. Those of ordinary skill in the art can understand and implement the present disclosure without creative effort.

As used herein, the term "and/or" includes any and all combinations of one or more of the associated listed items. Further, the singular forms and the articles "a", "an", and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening element may be present.

The descriptions above are preferred implementations of the present disclosure. It should be noted that for a person of ordinary skill in the domain, various improvements and modifications can be made without departing from the principles of the present disclosure. These improvements and modifications shall also be regarded as falling into the protection scope of the present disclosure.

What is claimed is:

1. An impedance matching method for a CLC branch of a low-frequency resonance suppression device, comprising:

establishing an equivalent circuit model for a power supply system with a low-frequency resonance suppression device joined in;

obtaining, according to a target low-frequency harmonic frequency band and the equivalent circuit model, constraints required by the power supply system for suppressing low-frequency harmonics;

constructing an objective function based on a low-frequency harmonic suppression rate in a bus of the power supply system;

obtaining a multi-constraint objective optimization function of an impedance of the CLC branch based on the constraints and the objective function;

solving the multi-constraint objective optimization function through a harmony search algorithm to obtain an impedance parameter of the CLC branch; and constructing the CLC branch with the obtained impedance parameter to achieve improved harmonic suppression effect for the power supply system.

2. The impedance matching method according to claim 1, further comprising:
  testing a harmonic content of each order of the power supply system without the low-frequency resonance suppression device joined in, and generating a harmonic content profile; and
  determining the target low-frequency harmonic frequency band to be suppressed by the low-frequency resonance suppression device based on the harmonic content profile.

3. The impedance matching method according to claim 1, wherein the constraints comprise a first constraint based on a fundamental frequency resonance, a second constraint based on a series resonance frequency, a third constraint based on a reactive power capacity, and a fourth constraint based on a harmonic current.

4. The impedance matching method according to claim 3, wherein the obtaining, according to a target low-frequency harmonic frequency band and the equivalent circuit model, constraints required by the power supply system for suppressing low-frequency harmonics comprises:
  forming the fundamental frequency resonance at a fundamental frequency, in the equivalent circuit model, by using a first inductance and a first capacitance in the CLC branch, to obtain the first constraint based on the fundamental frequency resonance;
  arranging an overall series resonance frequency of the CLC branch to be within the target low-frequency harmonic frequency band, to obtain the second constraint based on the series resonance frequency;
  obtaining the third constraint based on the reactive power capacity, according to a parameter range of the reactive power capacity that the power supply system is capable of bearing; and
  obtaining the fourth constraint based on the harmonic current, according to a harmonic current in an active power filter in the low-frequency resonance suppression device.

5. The impedance matching method according to claim 4, wherein the first constraint is expressed as following function:

$$F_1\left(Z_1 = \frac{1}{j\omega C_1} - j\omega L_1\right)_{f=50\ Hz} = \frac{1}{j\omega C_1} - j\omega L_1 = \varepsilon; \quad (1)$$

$Z_1$ represents an overall impedance formed by the first inductance ($L_1$) and the first capacitance ($C_1$) in the fundamental frequency resonance of the CLC branch; j represents an imaginary unit; ω represents an angular frequency of the power supply system; ε represents infinitesimal; and 50 Hz represents the fundamental frequency.

6. The impedance matching method according to claim 5, wherein the second constraint is expressed as following function:

$$F_2(Z_1 + Z_2)_{f=f^*} = j\omega L_1 + \frac{1}{j\omega C_1} + \frac{1}{j\omega C_2} = \varepsilon, \quad (2)$$

$$f^* \in (f_{low}, f_{high});$$

wherein $Z_2$ represents a capacitive reactance of a second capacitance in the CLC branch; $f_{low}$ and $f_{high}$ represent a lower limit and an upper limit of the target low-frequency harmonic frequency band; and $C_2$ represents the second capacitance of the CLC branch.

7. The impedance matching method according to claim 6, wherein the third constraint is expressed as following function:

$$F_3\left(\frac{U^2}{|Z_1 + Z_2|}\right) = \frac{U^2}{\left|j\omega L_1 + \frac{1}{j\omega C_1} + \frac{1}{j\omega C_2}\right|} \leq \Delta Q; \quad (3)$$

wherein U represents a voltage level of the bus of the power supply system; and ΔQ represents the parameter range of the reactive power capacity that the power supply system is capable of bearing.

8. The impedance matching method according to claim 7, wherein the fourth constraint is expressed as following function:

$$F_4\left(\frac{i_c}{i_{APF}}\right)_{f=f^*} = \left|\frac{Z_1}{Z_1 + Z_2 + Z_{fq}}\right| > 1,\ f^* \in (f_{low}, f_{high}); \quad (4)$$

wherein $i_c$ represents a current flowing to the CLC branch; $i_{APF}$ represents a harmonic current generated by the active power filter in the low-frequency resonance suppression device; and $Z_{fq}$ represents an overall equivalent impedance of a passive filter branch in the power supply system.

9. The impedance matching method according to claim 8, wherein the objective function is:

$$f(Z_1, Z_2) = \left|\frac{i_{sh}}{i_{lh}}\right| \quad (5)$$
$$= \left|\frac{(Z_1 + Z_2) * Z_{fq}}{\left[(1-K) * Z_1 + Z_2 + (Z_{fq} * Z_s)/(Z_{fq} + Z_s)\right] * (Z_{fq} * Z_s)}\right|;$$

wherein $i_{sh}$ represents a harmonic current on the bus of the power supply system, and $i_{lh}$ represents a current of an equivalent harmonic current source branch of a harmonic load; $i_{sh}/i_{lh}$ represents the low-frequency harmonic suppression rate in the bus of the power supply system; K represents a set control parameter; $Z_s$ represents an equivalent impedance of the power supply system; and the multi-constraint objective optimization function is:

$$\begin{cases} \frac{1}{j\omega C_1} - j\omega L_1\big|_{f=50\ Hz} = \varepsilon \\ j\omega L_1 + \frac{1}{j\omega C_1} + \frac{1}{j\omega C_2}\big|_{f=f^*} = \varepsilon,\ f^* \in (f_{low}, f_{high}) \\ \frac{U^2}{\left|j\omega L_1 + \frac{1}{j\omega C_1} + \frac{1}{j\omega C_2}\right|} \leq \Delta Q \\ \left|\frac{Z-1}{Z_1 + Z_2 + Z_{fq}}\right|_{f=f^*} > 1,\ f^* \in (f_{low}, f_{high}) \\ \min f(Z_1, Z_2) = \left|\frac{(Z_1 + Z_2) * Z_{fq}}{\left[(1-K) * Z_1 + Z_2 + (Z_{fq} * Z_s)/(Z_{fq} + Z_s)\right] * (Z_{fq} * Z_s)}\right| \end{cases}$$

10. The impedance matching method according to claim 9, wherein the solving the multi-constraint objective optimization function through a harmony search algorithm to obtain an impedance parameter of the CLC branch comprises:

substituting the equivalent impedance of the power supply system, the overall equivalent impedance of the passive filter branch in the power supply system, and the parameter range of the reactive power capacity that the power supply system is capable of bearing into the harmony search algorithm, to obtain multi-constraint objective optimization function about the first capacitance, the first inductance, and the second capacitance;

initializing a harmony parameter of the harmony search algorithm; and solving the multi-constraint objective optimization function about the first capacitance, the first inductance and the second capacitance by using the initialized harmony search algorithm, to obtain the impedance parameter of the CLC branch.

* * * * *